United States Patent
Murphy et al.

[19]

[11] Patent Number: 5,515,961
[45] Date of Patent: May 14, 1996

[54] PORTABLE RADIAL STACKING CONVEYOR

[75] Inventors: Richard B. Murphy, Murdock; Paul Schmidgall, Morris, both of Minn.

[73] Assignee: Superior Industries, Inc., Morris, Minn.

[21] Appl. No.: 288,995

[22] Filed: Aug. 11, 1994

[51] Int. Cl.⁶ ................................................. B65G 41/00
[52] U.S. Cl. ...................................... 198/302; 198/306
[58] Field of Search .................................. 198/300, 302, 198/306, 315, 317, 318

[56] References Cited

U.S. PATENT DOCUMENTS

| | | | |
|---|---|---|---|
| 3,552,546 | 1/1971 | Rath | 198/233 |
| 4,135,614 | 1/1979 | Penterman | 198/306 |
| 4,171,040 | 10/1979 | Nickol | 198/302 |
| 4,427,104 | 1/1984 | Reid, Jr. | 198/306 |
| 4,800,962 | 1/1989 | Murray | 172/126 |
| 4,813,839 | 3/1989 | Compton | 414/345 |

FOREIGN PATENT DOCUMENTS

| | | | |
|---|---|---|---|
| 1271442 | 7/1990 | Canada | 198/302 |

*Primary Examiner*—James R. Bidwell
*Attorney, Agent, or Firm*—Larry M. Jennings

[57] ABSTRACT

A portable radial stacker having improved stability during radial travel and operation and improved highway transport characteristics is disclosed. Existing material handling conveyor components may be retrofitted to embody the invention. The invention enables operators to transport portable radial stackers over public highways in most states without the requirement of using an escort because the maximum overall width in the transport configuration is 11 feet-6 inches. In addition, the width extends to more than 22 feet when configured for stacking operation and radial travel which provides greater stability than previous conveyors. Hydraulic fold-down outriggers convert the system between the transport configuration and the stacking configuration in only a few minutes which affords a great savings in time and labor. Transport wheels are equipped with air brakes and the radial travel wheels can be fitted with hydraulically actuated direct drive. Other safety features include check valves on all hydraulic cylinders, tandem axle, dual wheels on each axle configured on a walking beam. Radial movement is accomplished using underslung rocking spindle, dual flotation radial travel wheel and tire assemblies; operator controls for all hydraulic functions are provided at a single location.

20 Claims, 6 Drawing Sheets

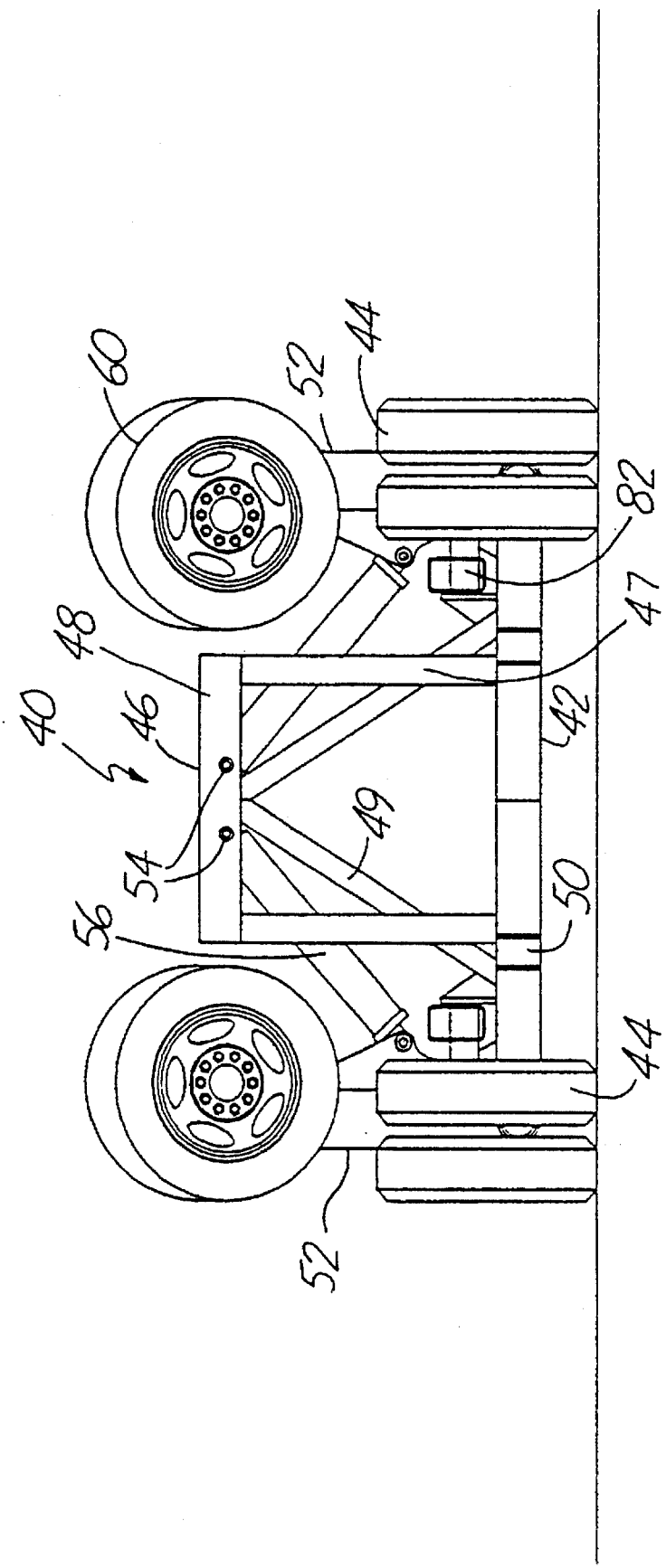

PORTABLE RADIAL STACKING CONVEYOR

BACKGROUND AND SUMMARY OF THE INVENTION

The present invention relates to material handling systems generally and portable radial stacking conveyor machinery in particular.

Conveyors adapted for handling sand, gravel, concrete, asphalt, coal, grain, ore, waste, earth, powders, granules, pellets, fuel, hulls, wood, bark, by-products, agricultural products, feeds, feedstocks, bulk material and other solids have been developed. A variety of belt type, preferably, and link type conveyors are offered for sale by commercial sources. Because linked conveyors and screw conveyors are the functional equivalent of belt conveyors for the purposes of the present disclosure, it is understood that references to conveyors are construed to include belt, link and screw conveyors. The choice of conveyor type often depends on the material for which it will be used to transfer. Belt conveyors move a cloth reinforced rubber belt over rollers and are used frequently to transfer and stockpile bulk material, especially material that is abrasive. Screw conveyors and bucket conveyors may be used with freely flowing materials and can lift vertically. Linked and paddle-type conveyors of various configurations intermediate between bucket and belt conveyors can be used to move materials an steeper inclinations than would be possible using flat belts.

Stockpiles may be created using conveyors that are often denominated stacking conveyors to distinguish them from transfer conveyors. The amount of material a given conveyor can stack is important in selecting equipment and locations. Increasing the length of a conveyor allows the height of the storage pile to increase with a resulting geometric increase in the amount of material stored. For example, Penterman discloses in U.S. Pat. No. 4,135,614 that increasing the height of a circular stockpile from 40 feet to 50 feet will nearly double the amount of material stored. Another way to increase the storage capacity is to form a radial stockpile. A radial stacking conveyor is a stacking conveyor that can be moved radially about a pintle or pivot point, denominated herein as center pivot, to increase the amount of bulk material that can be stockpiled at a site. Penterman further discloses that five to eight times as much material is stored in a 270 degree radial stockpile that has the same height as a circular stockpile. It could be economically advantageous to use a conveyor adapted for radial movement when the cost to do so is less than the cost of acquiring and operating the longer conveyor that would be required to store in a circular stockpile the amount of material that can be stored in a radial stockpile. For example, the foregoing reference states that a conveyor having a length of only 100 feet can store slightly more material in a 270 degree radial stockpile than can be stored in a circular stockpile using a conveyor that is 180 feet long.

When the bulk material handling needs at a particular site are temporary, it is often desirable to use portable conveyors. Agricultural products and road construction materials are examples of materials that may need to be temporarily stockpiled in large quantities at various locations from time to time.

Radial stacking conveyors can be portable and, in order to increase their portability, they may also fold or telescope. In order to be transported over public roads, a conveyor must be arranged so that it does not exceed the length and width restrictions of the locality in which the roads are situated. Although longer conveyors permit creation of larger stockpiles, shorter conveyors are transported more easily.

U.S. Pat. No. 4,135,614 to Penterman and U.S. Pat. No. 4,427,104 to Reid disclose foldable radial stackers. Rath discloses a telescoping radial stacking conveyor in U.S. Pat. No. 3,552,546. The maximum length of a radial stacking conveyor is limited, not only by its transport length, but also by the height to which the head section may be safely elevated. Radial stacking conveyors are usually supported by two wheels or two sets of wheels spaced apart from each other and the pivotable tail section. The spacing between the radial travel wheels must be sufficient to prevent the unit from tipping laterally when it is extended to its maximum operational length and height. The maximum distance by which the radial travel wheels may be separated is limited in practice by such factors as the requirement to narrow the equipment sufficiently for it to be transported over the public roads, the necessity to avoid covering the radial travel wheels with stored material, and the need to adequately weight or otherwise secure the tail section to prevent the head section from tipping down accidentally during operation. Previously available radial stacking conveyors that can be transported over public roads either require the use of escort vehicles during transport, lack stability, lack capacity, or cannot be converted quickly and efficiently between the transport and the operational configurations. In addition, previous portable radial stackers have failed to provide adequate horizontal distance between the radial travel wheels to accommodate conveyors of lengths now desirable.

Another problem with previously available portable radial stackers is that they have been susceptible to breakdown during transport over uneven roads. The great length of a radial stacking conveyor configured for transport can cause abnormal tensile loads at the towing hitch point and excessive fatigue and stress during transport over uneven surfaces and bumpy highways. The problem is exacerbated when a very long conveyor is fitted with a single transport axle located midway along its length.

Earlier portable radial stackers that perform comparably to the present invention have all required the expenditure of a substantial amount of labor and time to convert between transport and operational configurations. The effort required to convert between operational and transport configurations can be a substantial cost item and consume scarce skilled labor resources. Costs for equipment tear-down, relocation and set-up often contribute substantially to the cost of any temporary materials-handling job and could preclude the undertaking of otherwise desirable projects. Those costs are minimized by the present invention.

Not only is conversion between configurations faster, the present invention requires no jacking or other direct manipulation of machine structural support members by the operator to effect conversion. Most of the portable radial stackers previously disclosed appear to be less stable during the process of converting between the transport and operational configurations. No step of the procedure used by the present invention for converting between operational and transport configurations is known to compromise conveyor stability.

Yet another limitation of previously known radial stackers is the difficulty of adequately and properly controlling the radial motion to enable the desired degree of control over the stacking process.

What is needed is a portable radial stacking conveyor:

1. that can be converted swiftly and safely between transport and operational configurations;

2. that provides greater lateral stability in operation by configuring the radial travel wheels to have optimally wide horizontal separation;
3. that is narrow enough to be transported over public highways without escort vehicles; and
4. that has better durability than earlier portable radial stackers.

Fifteen minutes is ample time for an operator to convert the present invention between the transport and the operational configuration. Other systems require substantially more labor to convert and longer times to set-up. The present invention fulfills the other needs that remain unmet by previously known portable radial stacking systems whether they use belt, screw, bucket, paddle, link-belt, or other conveying mechanisms, all of which are defined as equivalent in this specification.

The invention disclosed herein provides a wider base during operation than does any portable radial stacker previously available commercially. It can be converted from the transport configuration to the operational configuration in a matter of minutes without the necessity of jacking, blocking, or removing any structural support components.

The radial stacker of the present invention is equipped with brakes, preferably air brakes, and may be towed by a truck tractor or other vehicle. The transport wheels are preferably dual tandem wheels having a maximum width of 11 feet-5½ inches fitted to an underslung axle walking beam bogey on each end of an elongated member which may be solid, angled, or, preferably, a tubular axle. Use of walking beams to connect the transport wheels to the conveyor reduces the vertical displacement of the load by half when the apparatus encounters irregularities in the road surface and, as a result, greatly reduces the amount of stress and fatigue to which the equipment is exposed during transport. The design and construction of the underslung axle walking beam yields several important advantages: optimum machine height, improved stability, better obstruction clearance during transport, improved operational clearance for outriggers, and better attachment locations for connecting hydraulic cylinders used for outrigger operation.

The radial travel wheels are mounted to outriggers that pivot, or retract, upward for transport and pivot, or extend downward for stacking. Although the outriggers may be fashioned having any length, they are preferably of a length to result in an overall width of 22 feet-6 inches when configured for stacking. The dual radial travel wheels are mounted on rocker spindles and may optionally be equipped with a hydraulic drive motor to move the conveyor radially. This dual wheel/rocker spindle configuration adds stability by using flotation tires and by providing an inherently even weight distribution over each tire regardless of the conveyor angle with respect to the ground. The rocker spindle is underslung to improve stability of the system and to allow optimal spacing of the hydraulic cylinder pin points; for that reason, the hydraulic system operates at lower pressures than would otherwise be the case.

To operate the invention, a radial pivot plate is placed at the desired location for the radial stacker center pivot. Any needed electrical connection is made and the hydraulic pump started. Gasoline, diesel, or, preferably, an electric motor can supply power to the hydraulic pump. The outriggers are next, preferably hydraulically, or mechanically, pivoted, and thereby extended, downwardly and outwardly from the longitudinal axis of the conveyor to lower the radial travel wheels to a distance of approximately one inch from the ground. Any removable, foldable or telescoping sections are fitted and extended starting with the tail section to prevent tipping. The conveyor tail section anchor pivot is attached to the radial pivot plate which is fixed to a selected location on the ground to allow the conveyor to be moved radially about the center pivot during operation. The conveyor may then be raised to the desired height, either mechanically or, preferably, hydraulically. Finally, the outriggers are extended further downward to raise the transport wheels from the ground slightly and allow radial movement. The procedure is reversed to ready the conveyor for transport.

It is part of the preferred embodiment of the present invention to have all operational controls at a single location, to deliver all motive force hydraulically, and to operate all hydraulic devices from a single pump and reservoir. However, it is possible to use other configurations such as a series of dedicated pumps, reservoirs, and dispersed controls without departing from the scope of the invention. Similarly, in this preferred embodiment, the hydraulic cylinders are each fitted with check valves as a safety precaution although omission of the check valves or substitution of other safety mechanisms such as mechanical locks or stops would not depart from the scope of the invention.

It is further to be understood that existing conveyors may be retrofitted to embody the present invention or it may be included with newly manufactured conveyor systems.

BRIEF DESCRIPTION OF THE DRAWING

FIG. 7 is the view of FIG. 6 with the wheels configured for transport.

DETAILED DESCRIPTION OF THE DRAWING

Figure 1:
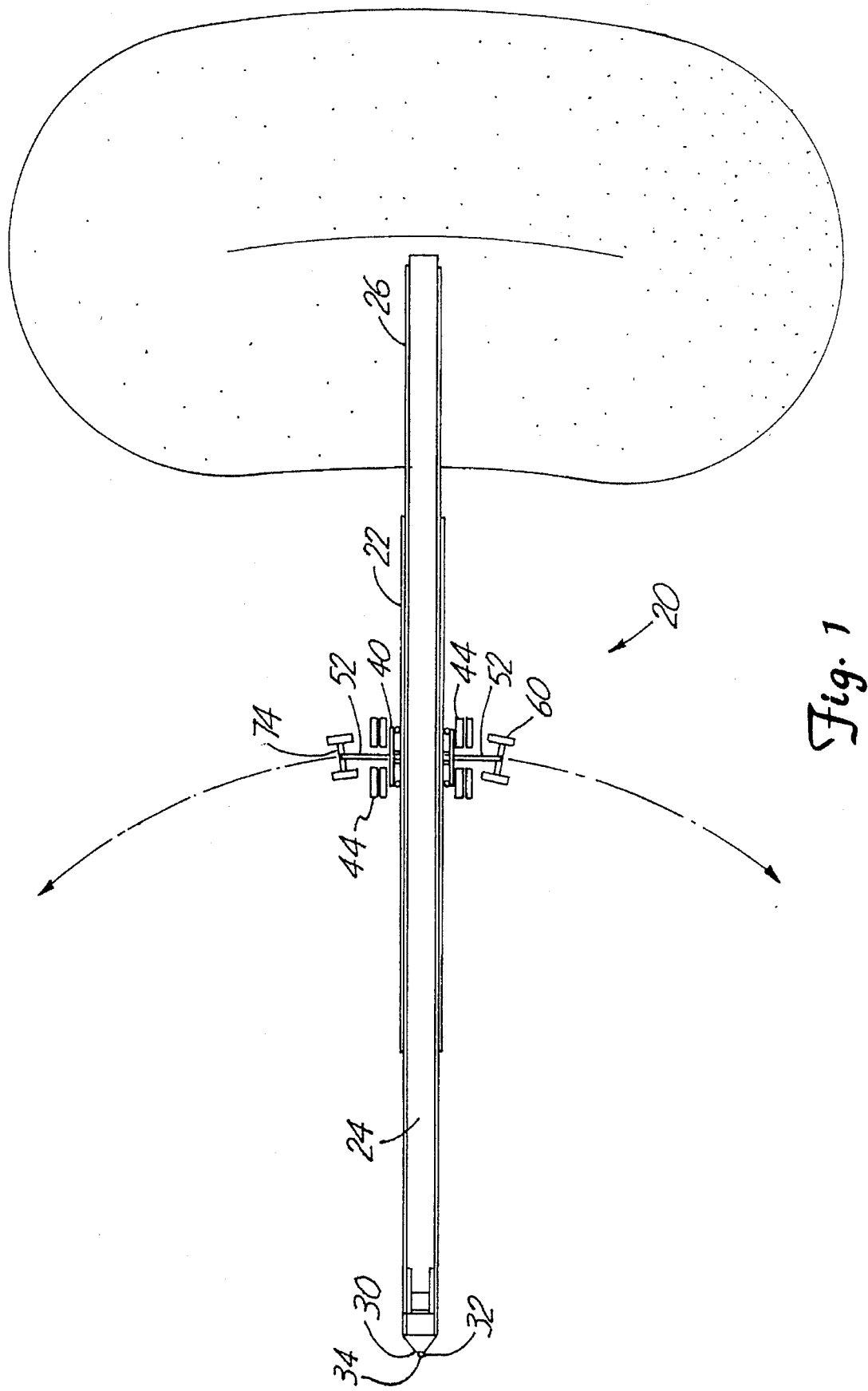
FIG. 1 shows a plan view of an embodiment of the invention configured for radial travel operation.

Referring first to FIG. 1 of the drawing where a plan view of the portable radial stacking conveyer 20 is shown comprising an elongated belt moving assembly 22 commercially available from many manufacturers including, without limitation, Superior Equipment, Peerless, Kolberg, Nordberg, Carter and Kolman. The elongated belt moving assembly 22 is comprised of an endless flexible belt that surrounds the length of an elongated frame. A drive roller causes the belt to move over a tail roller, a head roller and a series of idler rollers therebetween. In a preferred embodiment, the elongated belt moving assembly 22 has a tail section 24 and a head section 26. In a second preferred embodiment, the tail section 24 and the head section 26 are attached to the elongated belt moving assembly 22 by hinged attachments for foldable conveyor extensions 28. An alternative embodiment of the invention can store conveyor extensions by telescoping them within the central portion of the elongated belt moving assembly. When in operation, the tail section 24 is fitted to a radial pivot plate 30 that is fixed to the ground and about which the entire portable radial stacking conveyor 20 operates. The attachment of the tail section 24 to the conventional radial pivot plate 30 forms the center pivot 32. The tail section 24 is furnished with a conventional anchor pivot 34 for connecting to the center pivot 32.

Figure 2:
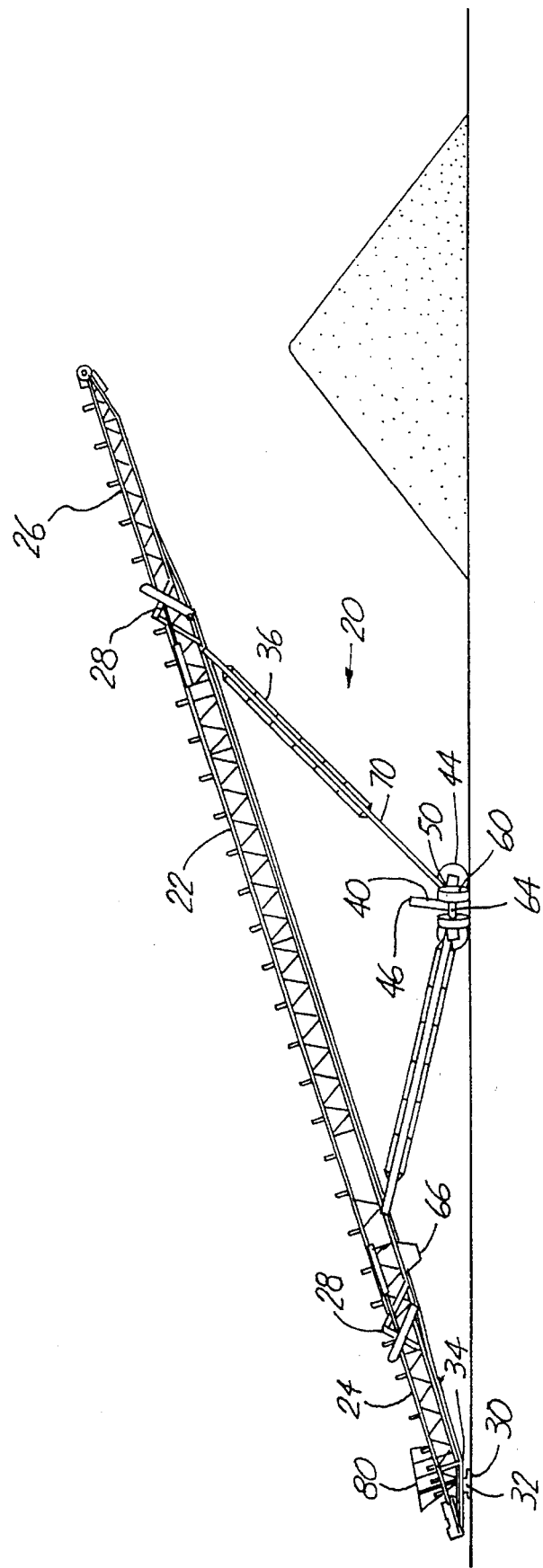
FIG. 2 is a side elevation of the embodiment of the invention depicted in FIG. 1.

In FIG. 2, the elongated means 36 for elevating the head section 26 is shown. A depiction of the carriage 40 is viewed more readily in FIGS. 3–7.

Figure 4:
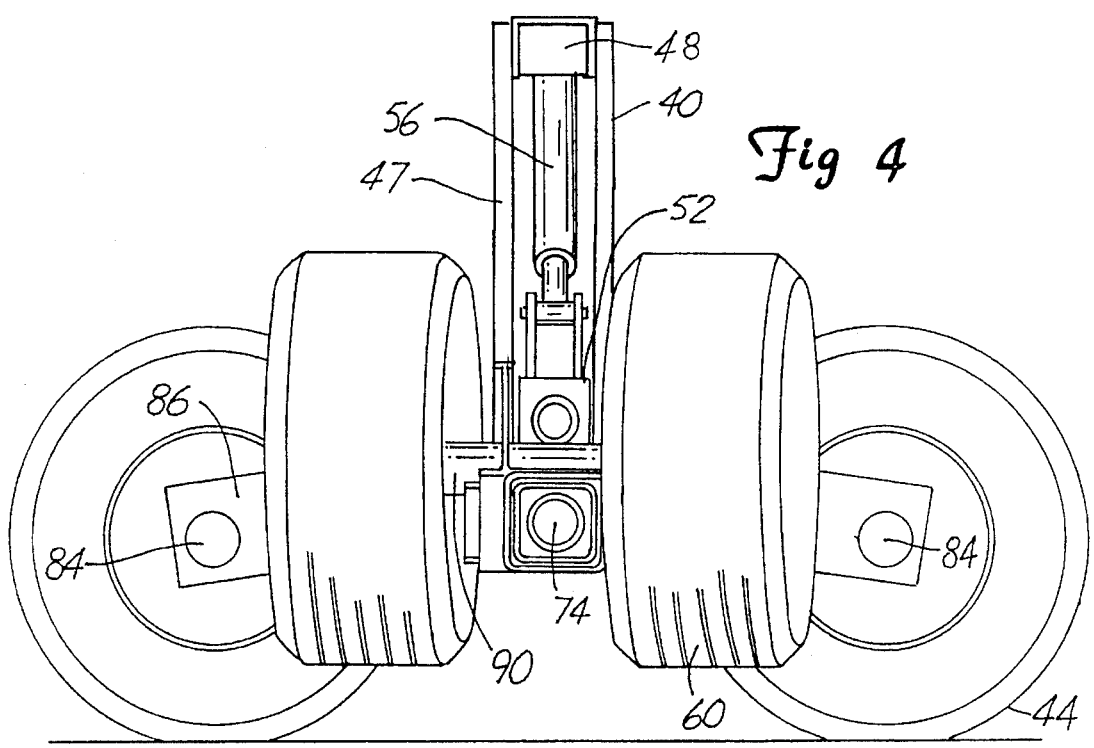
FIG. 4 is a side elevation view detail of the embodiment of the invention depicted in FIG. 1 showing the transport wheels in contact with the ground.
Figure 5:
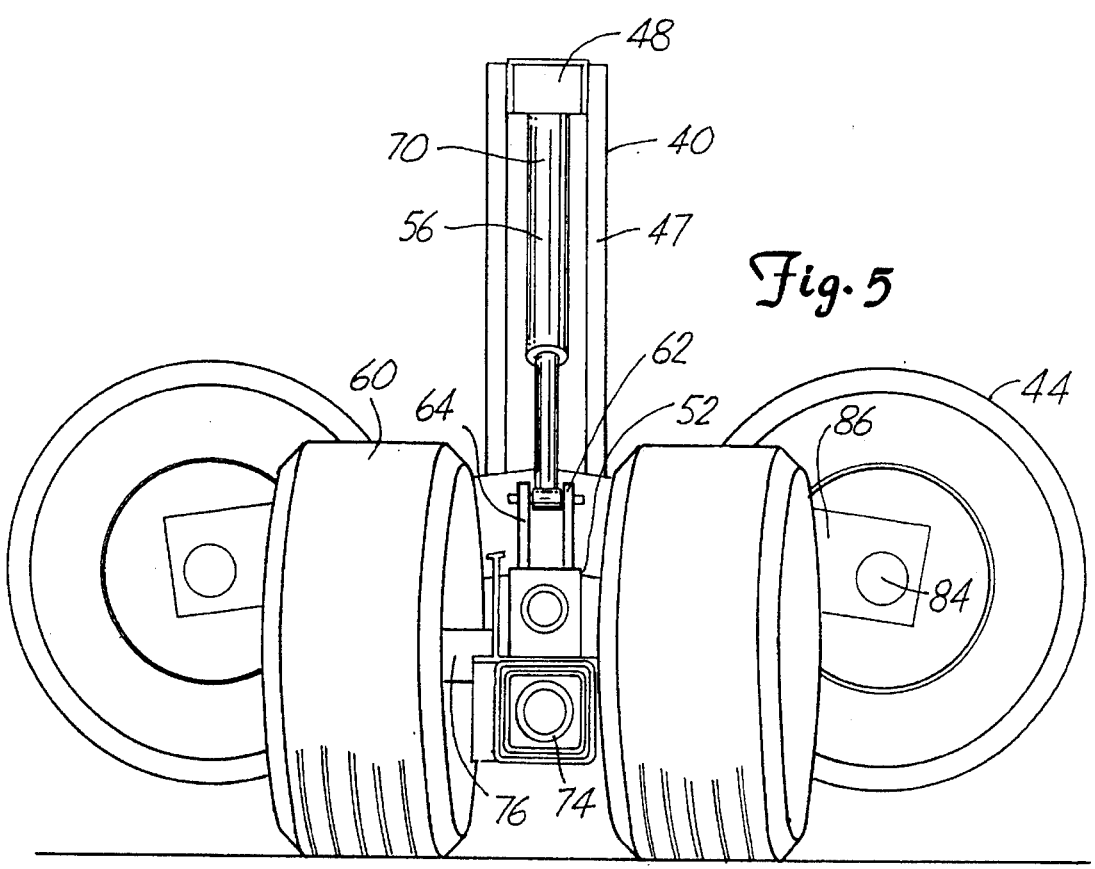
FIG. 5 is the view of FIG. 4 wherein the radial travel wheels are shown in contact with the ground.

For example, FIGS. 4 and 5 show end views of the carriage 40 with the elongated member 42 transversely disposed across the elongated belt moving assembly 22. The transport wheels 44 are preferably arranged in a dual tandem configuration. A support 46 extends upwardly from the elongated member 42. The support 46 may be fabricated from tubular, solid or other structural shapes and configured in a variety of manners although it is preferably equipped with a slotted vertical member 47 extending upwardly from each end of the elongated member 42 and a horizontal cross-member 48 upon which the elongated belt moving assembly 22 can rest during transport and storage. It is to be understood that the slotted vertical members 47, the cross member 48 and the angled support reinforcement members 49 could be fabricated in other equivalent configurations without departing from the scope of the invention, including configurations having, for example, diagonal cross-bracing, curved members, solid gusset plates, and open portions of the cross-member. Furthermore, it is possible to configure the support reinforcement members 49 so that they have adequate strength and rigidity to make the slotted vertical members 47 unnecessary. It is also possible to configure the slotted vertical member 47 so that there is no need for the reinforcement members 49.

Figure 6:
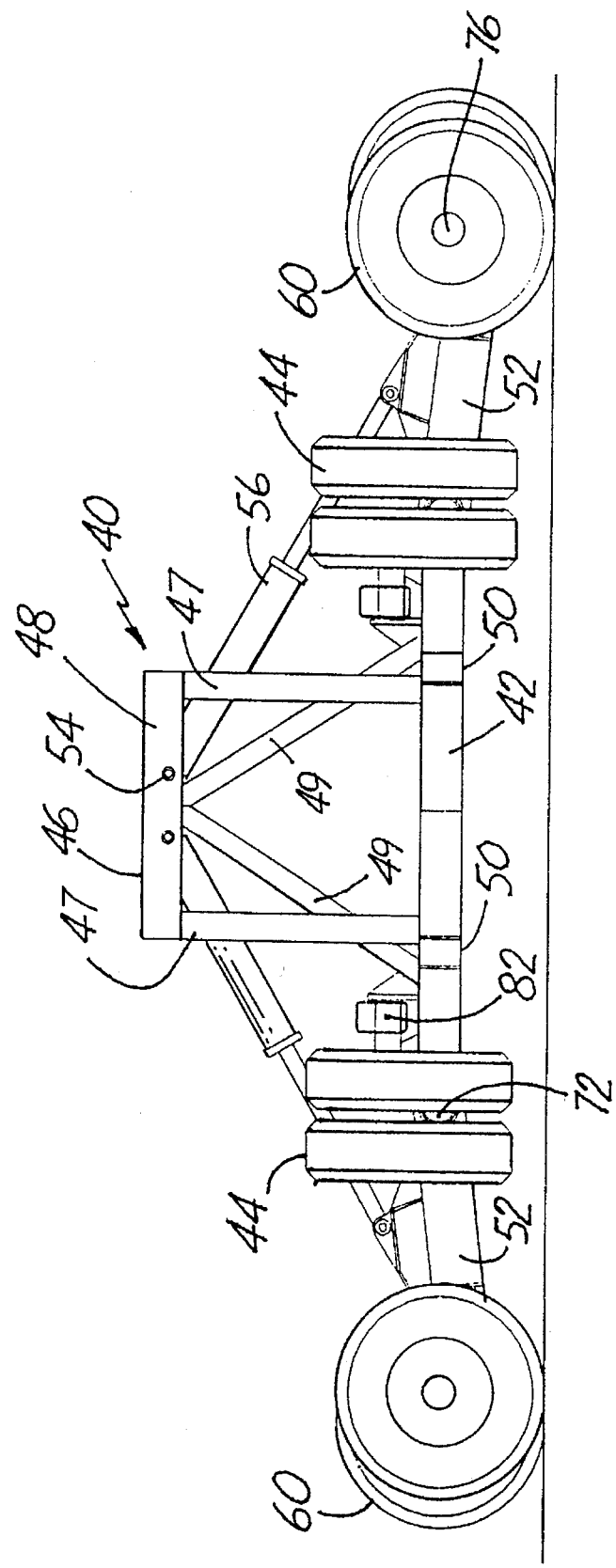
FIG. 6 shows the detail of FIG. 3 viewed from the center pivot.

FIG. 5 shows the transport wheels 44 raised in the manner expected when the portable radial stacking conveyor 20 is stockpiling bulk material. FIG. 6 shows the elevating means attachment point 50 and the elongated outrigger 52. In FIG. 7, the outrigger 52 is retracted upwardly to an overall width of not more than 11 feet 6 inches. The means for pivotally linking the outriggers 52 to the support 46 is comprised of large diameter support-mounted pins 54 disposed within the support 46 and the means for selectively extending the outriggers which is preferably comprised of a hydraulic cylinder 56, but may also be effected using screw jacks, drum winches or other techniques. A means for transferring weight from the transport wheels 44 to the radial travel wheels 60 selectively as desired is effected by extending the hydraulic cylinder 56 that is disposed between the support-mounted pin 54 and the outrigger cylinder pin 62 attached to the outer end of the outrigger 52.

Radial travel wheels can be moved arcuately about the center pivot by connecting a bar, chain, or cable to a lug, towing eye or other means for attachment 64 affixed to the outer end of the outriggers 52 and moving the conveyor with the aid of a tow vehicle such as a tractor.

Referring again to FIG. 2, a hitch 66 is provided for connecting the portable radial stacking conveyor 20 to a tow vehicle such as a truck tractor thereby facilitating relocation of the apparatus. When in operation, the portable radial stacking conveyor 20 may be adjusted to accommodate the stockpile height using means for elevating the head section 26 which are preferably comprised of a hydraulic cylinder 70 as depicted in the embodiment shown in FIG. 2, although it is to be understood that other means for elevating the conveyor head section such as a cable winch, lever or screw jacks would perform equivalently.

Figure 3:
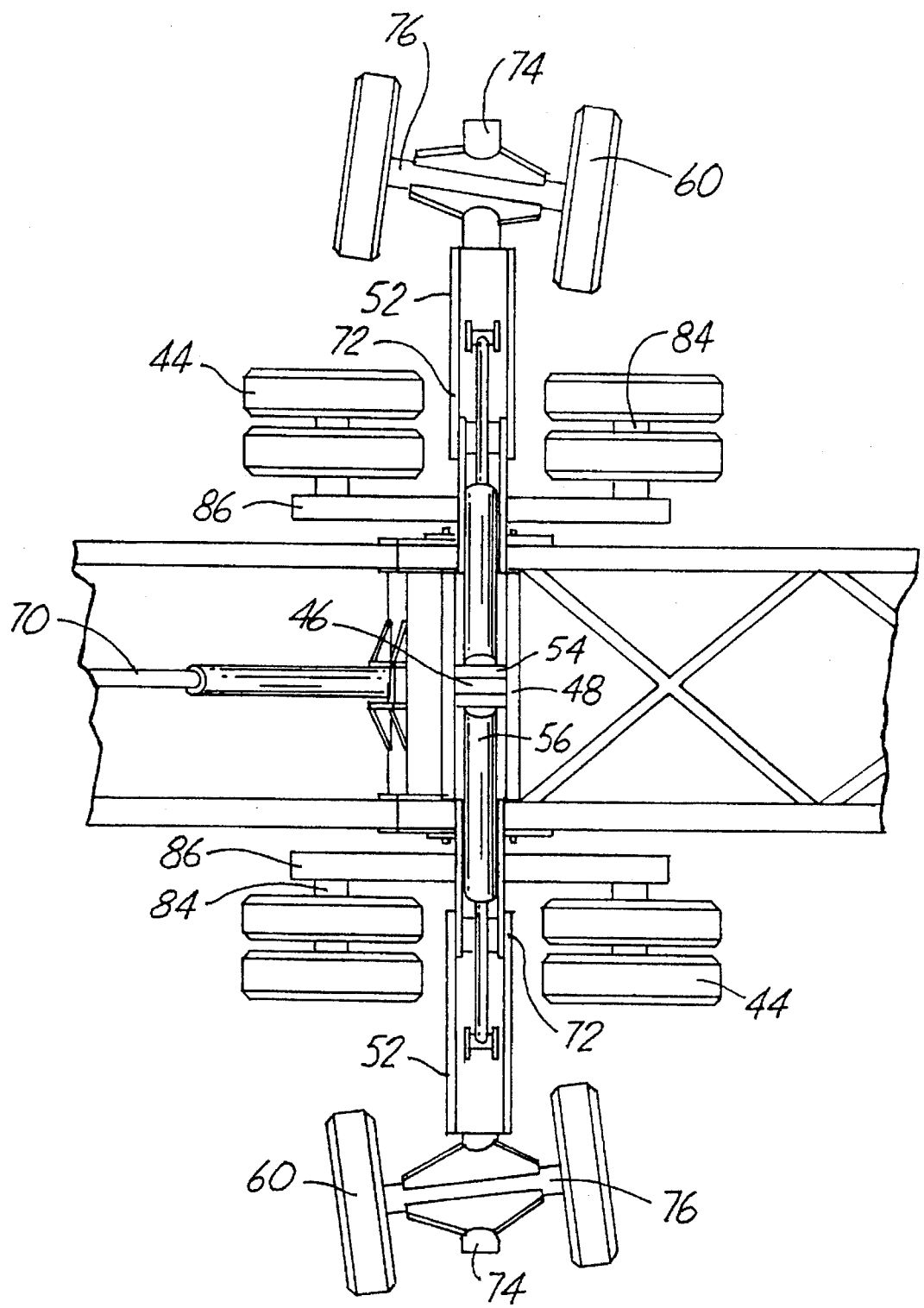
FIG. 3 is a plan view detail of the carriage portion of the embodiment of the invention depicted in FIG. 1.

The outrigger pivotal axes 72 are readily seen in FIGS. 3, 6, and 7. It is to be appreciated that the design of the outrigger pivotal axes 72 disclosed herein represents a substantial achievement. By placing the pivotal axes in close proximity to the ground, it is possible to lengthen the outriggers 52. It is this additional length that enables the radial travel wheels 60 to be extended sufficiently to make this portable radial stacking conveyor 20 very stable with a maximum overall width between 17 and 34 feet and, in the preferred embodiment, 22 feet 1.5 inches in overall width. When configured for transport the outriggers 52 retract so that the overall width is reduced to 11 feet 5.5 inches.

An underslung rocker spindle 74 extends longitudinally from the outrigger 52. A cross-axle 76 is pivotably mounted to the underslung rocker spindle 74 in alignment with the center pivot 32. A radial travel wheel 60, preferably equipped with a flotation tire, is mounted to each end of the cross-axle 76. When in operation for stockpiling bulk material, the portable radial stacking conveyor 20 is stabilized by two pairs of radial travel wheels 60. Nearly the entire weight of the portable radial stacking conveyor is supported on the radial travel wheels 60 that are preferably equipped with flotation tires to further enhance stability. Material is delivered to the portable radial stacking conveyor 20 through an infeed hopper 80 or by other means.

When the portable radial stacking conveyor 20 is configured for transport, the radial travel wheels 60 are retracted vertically upward as depicted in FIG. 7 and the transport wheels 44 which are equipped with brakes 82, preferably air brakes as defined in the present embodiment, are brought into contact with the ground. FIG. 4 shows the preferred underslung axle, 84 "inverted v," tandem axle walking beam 86 interposed between the elongated member 42 and the wheels 44. By incorporating underslung axles 84 in the tandem axle walking beam 86 design into the present preferred embodiment, additional clearance is made available for optimizing the locations of hydraulic cylinder pin points 54 and 62 which reduces the amount of hydraulic pressure required to operate the equipment and yields the benefits of longer equipment life and safer operation. However, it is to be understood that straight or "v-type" overslung axle walking beams may be used without departing from the invention.

An alternative embodiment of the invention includes a commercially available hydraulic drive motor 90 fitted at a cross-axle 76 to enable the portable radial stacking conveyor 20 to move radially without the necessity of locating a tow vehicle and the connecting chains, cables, bars and other paraphernalia needed to connect the tow vehicle.

In another preferred embodiment of the invention, all operational controls are configured so as to be accessible to an operator from a single location.

Changes and modifications in the specifically described embodiments can be carried out without departing from the scope of the invention which is intended to be limited only by the scope of the appended claims.

What is claimed is:

1. A portable radial stacking conveyor comprising:
   an elongated belt moving assembly having a tail section and a head section;
   a radial pivot plate having a center pivot for pivotably supporting the tail section proximate to the ground;
   an anchor pivot for pivotably connecting the tail section to the center pivot;
   elongated means for elevating the head section with respect to the tail section, said means for elevating being disposed between the belt moving assembly and;
   a carriage further comprised of;

an elongated member having two ends and oriented perpendicularly to the longitudinal axis of the elongated belt moving assembly;

at least one transport wheel attached to each end of the elongated member;

a support attached to and extending vertically upward from the elongated member for supporting the belt moving assembly during transport and storage;

at least one attachment point proximal to each end of the elongated member to which the means for elevating is pivotably attached;

at least one elongated outrigger having an inner end pivotably attached proximal to each end of the elongated member and an outer end;

means for selectively extending the outriggers distally from opposite sides of the longitudinal axis of the belt moving assembly generally horizontally along the axis of the elongated member;

at least one radial travel wheel rotatably attached to the outer end of each outrigger and selectively engageable with the ground by extending the outriggers, each radial travel wheel being oriented with its axis of rotation generally along the radius extending from the center pivot to the radial travel wheel;

means for transferring the weight of the belt moving assembly to the radial travel wheels;

means for moving the radial travel wheels radially about the center pivot;

means for selectively transferring the weight of the belt moving assembly to the transport wheels by retracting the outriggers and thereby raising the radial travel wheels;

a hitch for connecting the carriage and belt moving assembly to a transport vehicle.

2. A radial stacking conveyor as defined in claim 1 wherein said means for selectively extending each outrigger is further comprised of a hydraulic cylinder having one end pivotably connected to the upper portion of the support and the other end pivotably connected to the outrigger.

3. A radial stacking conveyor as defined in claim 2 wherein the outrigger pivotal axes are horizontally oriented generally perpendicular to the longitudinal axis of the elongated member.

4. A radial stacking conveyor as defined in claim 3 wherein the means for transferring the weight of the belt moving assembly to the radial travel wheels also transfers the weight of the carriage to the radial travel wheels and is further comprised of a first hydraulic cylinder, having one end pivotably connected to the upper portion of the support and the other end pivotably connected to a first outrigger, and a second hydraulic cylinder having one end pivotably connected to the upper portion of the support and the other end pivotably connected to a second outrigger situated oppositely from the first outrigger.

5. A radial stacking conveyor as defined in claim 4 further comprising:

a rocker spindle extending longitudinally from the outer end of each outrigger;

a cross-axle having a radial travel wheel at each end thereof pivotably attached to the rocker spindle so that the radial travel wheels are oriented with their axes of rotation generally along the radius extending from the center pivot to the radial travel wheels.

6. A radial stacking conveyor as defined in claim 5 wherein the rocker spindle is underslung.

7. A radial stacking conveyor as defined in claim 6 wherein at least two transport wheels are attached in tandem to each end of the elongated member by means of a walking beam assembly.

8. A radial stacking conveyor as defined in claim 7 wherein the walking beam assembly axles are underslung.

9. A radial stacking conveyor as defined in claim 8 having a width of not more than 11 feet-6 inches when the outriggers are retracted.

10. A radial stacking conveyor as defined in claim 9 having an overall width at the radial travel wheels between 17 feet and 34 feet when the outriggers are extended.

11. A radial stacking conveyor as defined in claim 10 wherein the transport wheels are equipped with brakes.

12. A radial stacking conveyor as defined in claim 11 wherein said transport wheels are comprised of tandem dual wheels equipped with air brakes.

13. A radial stacking conveyor as defined in claim 12 wherein the means for elevating the head section, the means for moving the belt moving assembly radially about the center pivot, and the means for extending and retracting the outriggers are hydraulically operated from a common hydraulic fluid reservoir and pumping system.

14. A radial stacking conveyor as defined in claim 13 wherein the means for applying motive force to the elongated member in a direction tangential to the arc described by motion of the radial travel wheels about the center pivot is comprised of a direct drive hydraulic motor interposed between at least one pair of radial travel wheels.

15. A radial stacking conveyor as defined in claim 14 wherein said belt moving assembly is extendable to an operational length of greater than 100 feet and contractible to a transport and storage length of less than 100 feet.

16. A carriage for moving a radial stacking conveyor comprising:

an elongated member having two ends and oriented perpendicularly to the longitudinal axis of the elongated belt moving assembly;

at least one transport wheel attached to each end of the elongated member;

a support attached to and extending vertically upward from the elongated member for supporting the belt moving assembly during transport and storage;

at least one attachment point proximal to each end of the elongated member to which the means for elevating is pivotably attached;

at least one outrigger having an inner end pivotably attached near each end of the elongated member and an outer end;

means for selectively downwardly pivotally extending the outriggers on both sides of the longitudinal axis of the belt moving assembly generally horizontally along the axis of the elongated member;

at least one radial travel wheel rotatably attached to the outer end of each outrigger and selectively engageable with the ground by downwardly pivotally extending the outriggers, each radial travel wheel being oriented with its axis of rotation generally along the radius extending from the center pivot to the radial travel wheel;

means for transferring the weight of the belt moving assembly and carriage to the radial travel wheels;

an attachment fixture for connecting means for moving the belt moving assembly radially about the center pivot;

means for selectively retracting the outriggers and raising the radial travel wheels thereby transferring the weight of the belt moving assembly to the transport wheels.

17. A method of converting an elongated conveyor so that it is portable or radial stacking comprising the steps of:

attaching the first end of an elongated means for elevating having a first end and a second end to the conveyor;

connecting the second end of the means for elevating to an elongated member disposed below the conveyor and oriented perpendicularly to the longitudinal axis of the conveyor;

attaching at least one transport wheel to each end of the elongated member;

attaching to the elongated member a support that extends vertically upward from the elongated member for supporting the conveyor during transport and storage;

pivotably attaching the inner end of an outrigger having an inner end and an outer end to a location proximal to each end of the elongated member;

rotatably attaching at least one radial travel wheel to the outer end of each outrigger, the radial travel wheels being oriented with their axes of rotation generally along the radii extending from the center pivot to the radial travel wheels;

linking the outriggers to the support with means for selectively pivotally extending the outriggers downwardly generally horizontally along the axis of the elongated member thereby causing the outrigger wheels to selectively engage the ground and transfer the weight of the conveyor and carriage to the radial travel wheels, and selectively upwardly pivotally retracting the outriggers to a generally vertical orientation perpendicular to the axis of the elongated member thereby causing the outrigger wheels to disengage from the ground and transferring the weight of the conveyor and carriage to transport wheels;

providing a means for moving the radial travel wheels radially, and;

fitting a hitch to the conveyor for connection to a transport vehicle.

18. A method for converting a radial stacking conveyor from a transport configuration to an operational configuration comprising the steps of:

placing a conveyor having a hydraulic pump at the desired location; starting the hydraulic pump;

lowering outriggers hydraulically so that radial travel wheels attached to the outer ends of the outriggers approach the surface of the ground;

securing, in their longitudinally extended positions, all extendable conveyor sections;

connecting the conveyor tail section pivotably to a pivot plate center pivot;

raising the conveyor to the desired height, and;

lowering the outriggers further to engage the radial travel wheels with the ground and disengage the transport wheels from the ground.

19. A carriage for moving a radial stacking conveyor comprising:

an elongated member having two ends and oriented perpendicularly to the longitudinal axis of the conveyor;

at least two transport wheels attached in tandem to each end of the elongated member by means of an underslung axle, walking beam assembly;

a support attached to and extending vertically upward from the elongated member for supporting the conveyor during transport and storage;

at least one attachment point proximal to each end of the elongated member to which the means for elevating is pivotably attached;

at least one pivotable outrigger having an inner end pivotably attached near each end of the elongated member and an outer end, the pivotal axis being generally horizontal and located above, and generally perpendicular to, the longitudinal axis of the elongated member;

a hydraulic cylinder pivotably linking each outrigger to the upper portion of the support to selectively pivotally extend, generally horizontally along the axis of the elongated member, and pivotally retract, generally vertically, the outriggers;

a rocker spindle extending longitudinally from the outer end of each outrigger;

a cross-axle pivotably attached to each rocker spindle and having a radial travel wheel rotatably attached to each end thereof so that the radial travel wheels are oriented with their axes of rotation generally along the radius extending from the center pivot to the radial travel wheels when the radial travel wheels are engaged with the ground by pivotally extending the outriggers downwardly;

means for causing the conveyor to move radially about the center pivot, and;

means for selectively transferring the weight of the conveyor to the transport wheels by retracting the outriggers thereby raising the radial travel wheels.

20. The carriage defined in claim 19 wherein the means for moving the conveyor radially about the center pivot is comprised of a direct drive hydraulic motor interposed between a pair of radial travel wheels with its axis of rotation parallel to the cross-axle.

* * * * *